(12) United States Patent
Dai et al.

(10) Patent No.: US 11,747,498 B1
(45) Date of Patent: Sep. 5, 2023

(54) METHOD, SYSTEM, DEVICE AND MEDIUM FOR LANDSLIDE IDENTIFICATION BASED ON FULL POLARIMETRIC SAR

(71) Applicant: Chengdu University of Technology, Chengdu (CN)

(72) Inventors: Keren Dai, Chengdu (CN); Qiang Xu, Chengdu (CN); Rubing Liang, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/102,339

(22) Filed: Jan. 27, 2023

(30) Foreign Application Priority Data

Sep. 1, 2022 (CN) .................. 202211059361.4

(51) Int. Cl.
*G01V 1/00* (2006.01)
*G01S 13/90* (2006.01)
*G06V 10/80* (2022.01)
*G01S 7/41* (2006.01)
*G01S 13/86* (2006.01)

(52) U.S. Cl.
CPC ............. *G01V 1/008* (2013.01); *G01S 7/411* (2013.01); *G01S 13/867* (2013.01); *G01S 13/9076* (2019.05); *G06V 10/806* (2022.01)

(58) Field of Classification Search
CPC ... G01V 1/008; G01S 13/9076; G01S 13/867; G01S 7/411; G06V 10/806
See application file for complete search history.

(56) References Cited

U.S. PATENT DOCUMENTS

2020/0096628 A1 3/2020 Tanaka et al.
2023/0091343 A1\* 3/2023 Shi ...................... G01S 13/9023
342/25 A

FOREIGN PATENT DOCUMENTS

CN  101976357 A  10/2010
CN  103208001 A   7/2013
(Continued)

OTHER PUBLICATIONS

Notification to Grant Patent Right for Invention of Chinese Application No. 202211059361.4, dated Nov. 14, 2022, with English translation, 6 pages.

(Continued)

*Primary Examiner* — Bryan Bui
(74) *Attorney, Agent, or Firm* — Lippes Mathias LLP (57) ABSTRACT

A method, a system, a device and a medium for landslide identification based on full Polarimetry Synthetic Aperture Radar (full PoISAR) are provided. The method mainly includes: registering target full PoISAR data with target optical remote sensing data and target digital elevation model data to obtain a first registration result and a second registration result; determining a polarization feature, a decomposition feature, and a terrain feature of a target area according to registration results; determining a texture feature and a hue feature of the target area according to the target full PoISAR data; determining a spectrum feature of the target area according to the target optical remote sensing data; fusing abovementioned multi-dimensional features to obtain a target fusion feature; and inputting the target fusion feature into a landslide mass identification model for identifying a landslide mass, so as to determine a landslide area in the target area.

12 Claims, 4 Drawing Sheets

(56) References Cited

FOREIGN PATENT DOCUMENTS

| | | |
|---|---|---|
| CN | 103675812 A | 3/2014 |
| CN | 103869296 A | 6/2014 |
| CN | 104951789 A | 9/2015 |
| CN | 105808936 A | 7/2016 |
| CN | 105957311 A | 9/2016 |
| CN | 108168526 A | 6/2018 |
| CN | 108459318 A | 8/2018 |
| CN | 112307901 A | 2/2021 |
| CN | 113191374 A | 7/2021 |
| CN | 114494282 A | 12/2021 |
| CN | 114252509 A | 3/2022 |
| CN | 114463643 A | 5/2022 |
| JP | 2009211344 A | 9/2009 |

OTHER PUBLICATIONS

First Office Action of Chinese Application No. 202211059361.4, dated Oct. 31, 2022, with English translation, 13 pages.
Allowed Claims of Chinese Application No. 202211059361.4, with English translation, 23 pages.

\* cited by examiner

```
┌─────────────────────────────────────────────────────────┐
│ Acquire target full PolSAR data, target optical remote  │── S1
│ sensing data, and target Digital Elevation Model (DEM)  │
│ data of a target area                                   │
└─────────────────────────────────────────────────────────┘
                            ▼
┌─────────────────────────────────────────────────────────┐
│ Register the target full PolSAR data with the target    │── S2
│ optical remote sensing data and the target DEM data to  │
│ obtain a first registration result and a second         │
│ registration result                                     │
└─────────────────────────────────────────────────────────┘
                            ▼
┌─────────────────────────────────────────────────────────┐
│ Determine a polarization feature of the target area     │── S3
│ according to the first registration result              │
└─────────────────────────────────────────────────────────┘
                            ▼
┌─────────────────────────────────────────────────────────┐
│ Determine a decomposition feature of the target area    │── S4
│ according to the polarization feature                   │
└─────────────────────────────────────────────────────────┘
                            ▼
┌─────────────────────────────────────────────────────────┐
│ Determine a terrain feature of the target area          │── S5
│ according to the second registration result             │
└─────────────────────────────────────────────────────────┘
                            ▼
┌─────────────────────────────────────────────────────────┐
│ Determine a texture feature and a hue feature of the    │── S6
│ target area according to the target full PolSAR data    │
└─────────────────────────────────────────────────────────┘
                            ▼
┌─────────────────────────────────────────────────────────┐
│ Determine a spectrum feature of the target area         │── S7
│ according to the target optical remote sensing data     │
└─────────────────────────────────────────────────────────┘
                            ▼
┌─────────────────────────────────────────────────────────┐
│ Fuse the texture feature, the hue feature, the spectrum │── S8
│ feature, the polarization feature, the decomposition    │
│ feature, and the terrain feature to obtain a target     │
│ fusion feature of the target area                       │
└─────────────────────────────────────────────────────────┘
                            ▼
┌─────────────────────────────────────────────────────────┐
│ Input the target fusion feature into a landslide mass   │── S9
│ identification model for identifying a landslide mass,  │
│ so as to determine a landslide area in the target area  │
└─────────────────────────────────────────────────────────┘
```

METHOD, SYSTEM, DEVICE AND MEDIUM FOR LANDSLIDE IDENTIFICATION BASED ON FULL POLARIMETRIC SAR

CROSS REFERENCE TO RELATED APPLICATION

This patent application claims the benefit and priority of Chinese Patent Application No. 202211059361.4, entitled "METHOD, SYSTEM, DEVICE AND MEDIUM FOR LANDSLIDE IDENTIFICATION BASED ON FULL POLARIZATRIC SAR" filed with the China National Intellectual Property Administration on Sep. 1, 2022, the disclosure of which is incorporated by reference herein in its entirety as part of the present application.

TECHNICAL FIELD

The present disclosure relates to the technical field of landslide identification, and in particular, to a method, a system, a device and a medium for landslide identification based on Full Polarimetric Synthetic Aperture Radar (Full PoISAR).

BACKGROUND

A satellite-borne optical remote sensing image is greatly affected by clouds, fog, and has relatively low resolution, which is easy to cause inaccurate identification results of coseismic landslides. As a novel means of earth observation, Synthetic Aperture Radar (SAR) can acquire microwave remote sensing images under cloudy and foggy weather conditions, and the radar satellites have a short revisit period, and a wide coverage in terms of photographed images. The SAR breaks through limitations of optical remote sensing images, and gradually becomes a mainstream remote sensing means for earthquake and geological disaster deformation monitoring. SAR remote sensing satellites for different application requirements have been competitively launched, which provides more options for monitoring of geological disasters. At present, SAR sensor continues to develop towards multiple wave bands, multiple polarization modes, high resolution, and short-term revisit, which provides more guarantees for identification and research of coseismic landslides.

According to their characteristics, existing methods for identifying coseismic landslides based on remote sensing images can be summarized as follows: (1) a landslide classification method based on an optical remote sensing image; and (2) a landslide information extraction method based on SAR image change detection.

For the landslide classification method based on the optical remote sensing image, the optical remote sensing image can capture the hue, morphology, and texture features of a landslide very well. When landslides are identified by using the optical remote sensing image, it is necessary to deeply compare the differences between the optical remote sensing images of massive landslides and other ground objects. Optical remote sensing images with landslide hues, textures and morphological features are sampled to construct machine learning based optical remote sensing for landslide identification. The method aims to classify ground objects by using their own information from optical remote sensing images. Optical remote sensing images are affected by cloudy, foggy weather and other influences, which often leads to difficulty in effective imaging and inability to realize the landslide identification at the first time after a disaster, making it impossible to meet the needs of emergency investigation.

For the landslide identification method based on SAR image change detection, a difference image is generated by using two multi-temporal landslide images and using a log-ratio operator, and the optical remote sensing image and an SAR image are registered to select a reliable sample. Finally, landslide identification is realized according to a machine learning model. The method aims to classify by using intensity information of the SAR image, but does not dig deeply into other feature information of the SAR image. A classified result is easily affected by errors, such as geometric distortion of the SAR image, thereby causing a large number of error classifications and missing classifications.

In conclusion, current landslide identification methods have the following problems. (1) A landslide is identified by only depending on the optical remote sensing image, which is greatly affected by cloud and fog, and has low identification efficiency and poor timeliness. (2) An SAR image change monitoring method only uses the difference of the scattering intensity of different ground objects in the SAR image, but does not dig deeply into other features of a target ground object in the SAR image, and the change monitoring method is greatly affected by other ground objects around, so accurate information on ground objects cannot be acquired.

SUMMARY

An objective of some embodiments of the present disclosure is to provide a method, a system, a device and a medium for landslide identification based on PoISAR, so as to avoid the influence of cloud, fog, and other ground objects around on the identification of a landslide, and to improve the landslide identification accuracy and the landslide identification efficiency.

In order to achieve the abovementioned objective, the present disclosure provides the following solutions:

A method for landslide identification based on PoISAR includes:

acquiring target full PoISAR data, target optical remote sensing data, and target Digital Elevation Model (DEM) data of a target area;

registering the target full PoISAR data with the target optical remote sensing data and the target DEM data to obtain a first registration result and a second registration result;

determining a polarization feature of the target area according to the first registration result;

determining a decomposition feature of the target area according to the polarization feature;

determining a terrain feature of the target area according to the second registration result;

determining a texture feature and a hue feature of the target area according to the target full PoISAR data;

determining a spectrum feature of the target area according to the target optical remote sensing data;

fusing the texture feature, the hue feature, the spectrum feature, the polarization feature, the decomposition feature, and the terrain feature to obtain a target fusion feature of the target area; and inputting the target fusion feature into a landslide mass identification model for identifying a landslide mass, so as to determine a landslide area in the target area.

In some embodiments, the registering the target full PoISAR data with the target optical remote sensing data and the target DEM data to obtain a first registration result and a second registration result specifically includes:

preprocessing the target full PoISAR data, the target optical remote sensing data, and the target DEM data;

performing color synthesis on the preprocessed target full PoISAR data;

registering the target full PoISAR data after the color synthesis with the preprocessed target optical remote sensing data to obtain the first registration result; and registering the target full PoISAR data after the color synthesis with the preprocessed target DEM data to obtain the second registration result.

In some embodiments, the preprocessing the target full PoISAR data specifically includes:

performing multi-look processing on the target full PoISAR data;

performing filtering processing on the target full PoISAR data after the multi-look processing; and performing geocoding processing on the target full PoISAR data after the filtering processing, and taking the target PoISAR data after the geocoding processing as preprocessed target full PoISAR data.

In some embodiments, a process of constructing the landslide mass identification model includes:

acquiring a sample data set, the sample data set including sample full PoISAR data, sample optical remote sensing data, and sample DEM data of multiple sample areas with marked landslide areas;

determining a sample fusion feature corresponding to each of the sample areas according to the sample full PoISAR data, the sample optical remote sensing data, and the sample DEM data; and training a Support Vector Machine (SVM) model by using the sample fusion feature to obtain the landslide mass identification model.

A system for landslide identification based on full PoISAR is also provided. The system is implemented by the abovementioned method. The system includes:

a data acquisition module, configured to acquire target full PoISAR data, target optical remote sensing data, and target DEM data of a target area;

a registration module, configured to register the target full PoISAR data with the target optical remote sensing data and the target DEM data to obtain a first registration result and a second registration result;

a polarization feature determination module, configured to determine a polarization feature of the target area according to the first registration result;

a decomposition feature determination module, configured to determine a decomposition feature of the target area according to the polarization feature;

a terrain feature determination module, configured to determine a terrain feature of the target area according to the second registration result;

a texture and hue feature determination module, configured to determine a texture feature and a hue feature of the target area according to the target full PoISAR data;

a spectrum feature determination module, configured to determine a spectrum feature of the target area according to the target optical remote sensing data;

a feature fusing module, configured to fuse the texture feature, the hue feature, the spectrum feature, the polarization feature, the decomposition feature, and the terrain feature to obtain a target fusion feature of the target area; and a landslide area determination module, configured to input the target fusion feature into a landslide mass identification model for identifying a landslide mass, so as to determine a landslide area in the target area.

In some embodiments, the registration module includes:

a data preprocessing submodule, configured to preprocess the target full PoISAR data, the target optical remote sensing data, and the target DEM data;

a color synthesis submodule, configured to perform color synthesis on the preprocessed target full PoISAR data;

a first registration submodule, configured to register the target full PoISAR data after the color synthesis with the preprocessed target optical remote sensing data to obtain the first registration result; and a second registration submodule, configured to register the target full PoISAR data after the color synthesis with the preprocessed target DEM data to obtain the second registration result.

In some embodiments, the data preprocessing submodule includes:

a multi-look processing unit, configured to perform multi-look processing on the target full PoISAR data;

a filtering processing unit, configured to perform filtering processing on the target full PoISAR data after the multi-look processing; and a geocoding processing unit, configured to perform geocoding processing on the target full PoISAR data after the filtering processing, and take the target full PoISAR data after the geocoding processing as preprocessed target full PoISAR data.

In some embodiments, the system also includes: a landslide mass identification model construction module, configured to construct the landslide mass identification model.

The landslide mass identification model construction module includes:

a data set acquisition submodule, configured to acquire a sample data set, the sample data set including sample full PoISAR data, sample optical remote sensing data, and sample DEM data of multiple sample areas with marked landslide areas;

a sample fusion feature determination submodule, configured to determine a sample fusion feature corresponding to each of the sample areas according to the sample full PoISAR data, the sample optical remote sensing data, and the sample DEM data; and a SVM model training submodule, configured to train an SVM model by using the sample fusion feature to obtain the landslide mass identification model.

The present disclosure further provides an electronic device, which includes a memory and a processor. The memory is configured to store a computer program, and the processor is configured to run the computer program to enable the electronic device to execute the abovementioned method for identifying a landslide based on PoISAR.

The present disclosure further provides a non-transitory computer-readable storage medium, which stores a computer program. The abovementioned method for landslide identification based on PoISAR is implemented when the computer program is executed by a processor.

According to specific embodiments provided by the present disclosure, the present disclosure discloses the following technical effects:

According to the method for landslide identification based on PoISAR provided by the present disclosure, the PoISAR data is registered with the optical remote sensing data and the DEM data respectively to obtain the registration results, different features of the target area are extracted on the basis of the registration results. The feature information on multiple dimensional, such as a polarization feature, a decomposition feature, and a terrain feature, is fused, which can accurately reflect different ground object features of the target area, avoids the problem that the landslide identification is easily affected by weather when only depending on optical remote sensing data, improves the landslide identification accuracy and the landslide identification efficiency, and can acquire coseismic landslide disaster information in time after an earthquake.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description show merely some embodiments of the present disclosure, and those of ordinary skill in the art may still derive other drawings from these drawings without creative efforts.

Reference signs in the drawings: data acquisition module—1, registration module—2, polarization feature determination module—3, decomposition feature determination module—4, terrain feature determination module—5, texture and hue feature determination module—6, spectrum feature determination module—7, feature fusion module—8, and landslide area determination module—9.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of some embodiments of the present disclosure is to provide a method, a system, a device and a medium for landslide identification based on full PoISAR, so as to avoid the influence of cloud, fog, and other surrounding ground objects on landslide identification, and improve the landslide identification accuracy and the landslide identification efficiency.

In order to make the abovementioned objective, features, and advantages of the present disclosure more apparent and more comprehensible, the present disclosure is further described in detail below with reference to the drawings and specific implementations.

Embodiment 1

PoISAR data contains rich target information. A polarization characteristic and a decomposition feature can establish a relationship between a target shape structure and a physical attribute very well, so as to identify ground object information more accurately. According to the present disclosure, on the basis of deeply analyzing polarization features of a landslide mass and other ground object types by using the PoISAR data, through introducing a Pauli decomposition scattering feature and fusing multi-dimensional feature information such as a polarization feature, a texture feature, and a terrain feature, and in combination with a high-resolution optical remote sensing image as training sample, an SVM-based classification method is constructed to perform automatic landslide identification on the PoISAR data. The method can break through the limitation that optical images are easily affected by weather, and can acquire coseismic landslide disaster information in time after an earthquake.

Figure 1:
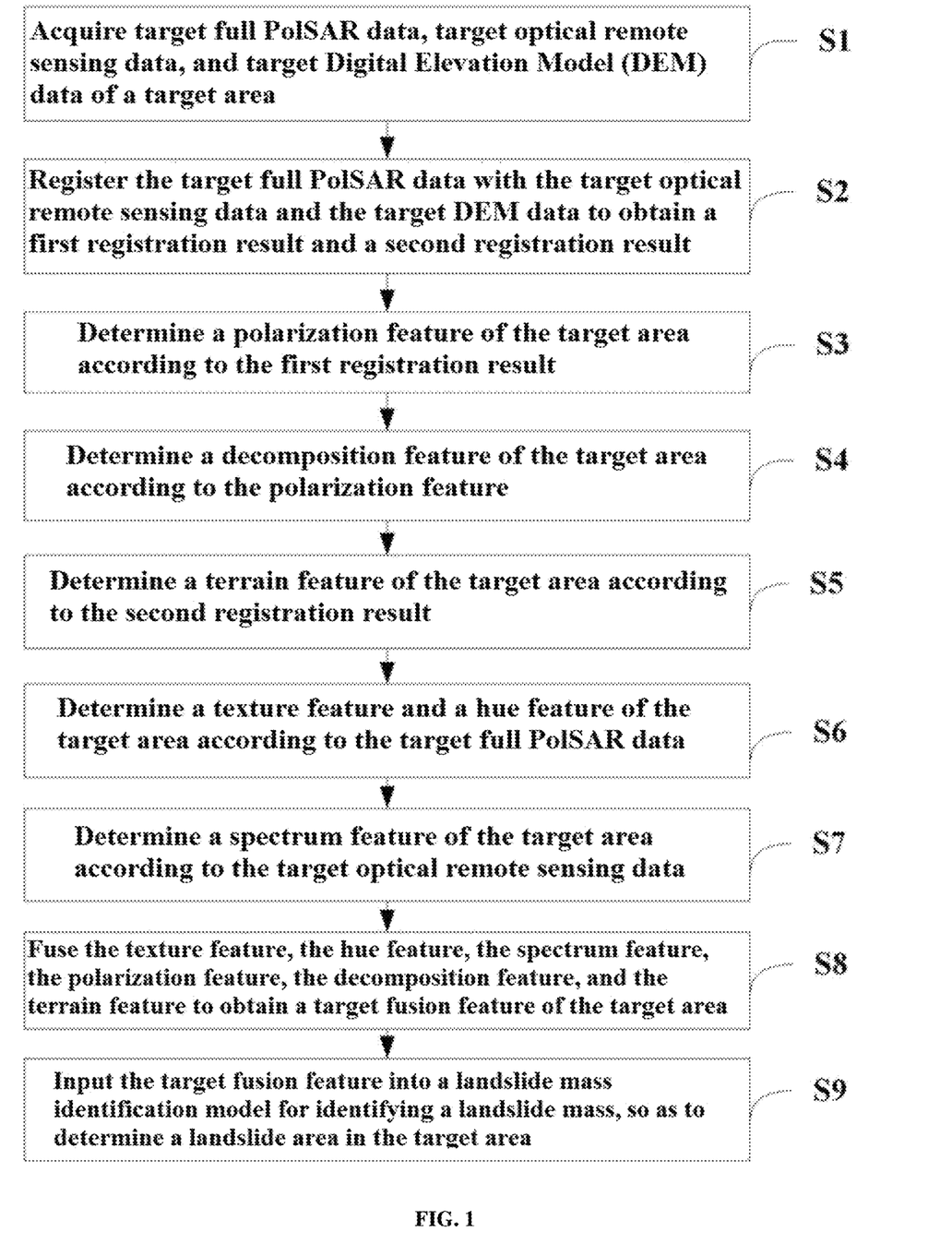
FIG. 1 is a flowchart of a method for landslide identification based on full PoISAR according to an embodiment of the present disclosure.

FIG. 1 is a flowchart of a method for landslide identification based on full PoISAR according to an embodiment of the present disclosure. As shown in FIG. 1, the method for landslide identification based on full PoISAR according to the present disclosure includes the following steps.

In step S1, target full PoISAR data (that is, a PoISAR image), target optical remote sensing data (that is, an optical remote sensing image), and target DEM data of a target area are acquired. In the present embodiment, the acquired data includes the PoISAR data, a high-resolution optical remote sensing image, and external reference DEM data covering the target area.

In step S2, the target PoISAR data is registered with the target optical remote sensing data and the target DEM data to obtain a first registration result and a second registration result.

Further, the step S2 specifically includes the following steps S21 to S24.

In step S21, the target PoISAR data, the target optical remote sensing data, and the target DEM data are preprocessed.

The step of preprocessing the target PoISAR data specifically includes the following steps.

(1) Multi-look processing is performed on the target PoISAR data. Specifically, the multi-look processing is a process of converting a polarization scattering matrix in the PoISAR image into a covariance matrix and a polarization coherence matrix. Through the abovementioned conversion, the objective of performing mean processing on range looks and azimuth looks of the PoISAR image can be achieved, so as to reduce influence of speckle noise on the error of the PoISAR image.

(2) Filtering processing is performed on the target PoISAR data after the multi-look processing. Specifically, the filtering processing is to calculate a mean and a variance of a pixel in each filtering window on the basis of a minimum mean square error and multiplicative noise, so as to obtain a prior mean and variance in the window. In many experiments, it is found that the filtering window with a size of 5*5 pixels has a better filtering effect on the image in the present disclosure, so the size of the filtering window used in the present disclosure is 5*5 pixels. Through the filtering processing, the speckle noise of the PoISAR image can be eliminated.

(3) Geocoding processing is performed on the target PoISAR data after the filtering processing, and the target PoISAR data after the geocoding processing is taken as preprocessed target PoISAR data. Specifically, the geocoding processing of the PoISAR image is a process of converting a slant range coordinate system of an original PoISAR image into an image in a DEM coordinate system.

According to the present disclosure, the PoISAR image is corrected through the geocoding processing.

The preprocessing the target optical remote sensing data and the DEM data includes that: (1) preprocessing, such as atmospheric correction, radiation correction, and image mosaicking, is performed on the target optical remote sensing data to obtain preprocessed optical remote sensing data; and (2) preprocessing, such as atmospheric correction, radiation correction, and image mosaicking, is performed on the target DEM data to obtain preprocessed DEM data.

In step S22, color synthesis is performed on the preprocessed target PoISAR data.

Specifically, a radar remote sensing system usually adopts four polarization modes including horizontal-horizontal polarization HH, vertical-vertical polarization VV, horizontal-vertical cross polarization HV, and vertical-horizontal cross polarization VH, and then the target full PoISAR data includes the data of four wave bands corresponding to four polarization modes HH, VV, HV and VH. The wave band corresponding to the horizontal-horizontal polarization HH is a red wave band, the wave band corresponding to the vertical-vertical polarization VV is a green wave band, and the wave band corresponding to the vertical-horizontal cross polarization VH is a blue wave band. In the present embodiment, color synthesis is performed by respectively taking red wave band data, green wave band data, and blue wave band data in the preprocessed target full PoISAR data as three channels of Red, Green, and Blue (RGB).

In step S23, the target full PoISAR data after the color synthesis is registered with the preprocessed target optical remote sensing data to obtain the first registration result.

In step S24, the target full PoISAR data after the color synthesis is registered with the preprocessed target DEM data to obtain the second registration result.

Specifically, the registration process is a process of performing oversampling on an image to be registered, determining a fitting polynomial characterizing a mapping relationship between a master image and a slave image by solving homonymous points, and finally, and obtaining the accurate offset of each pixel. The first registration result includes registered target full PoISAR data and target optical remote sensing data. The second registration result includes registered target full PoISAR data and target DEM data.

In step S3, a polarization feature of the target area is determined according to the first registration result.

In step S4, a decomposition feature of the target area is determined according to the polarization feature.

In step S5, a terrain feature of the target area is determined according to the second registration result.

Specifically, through the analysis of the registered optical remote sensing image and full PoISAR image, first, the distribution positions of a variety of ground objects on the optical remote sensing image are selected, and then the polarization features of the variety of ground objects at the positions are extracted in sequence from the full PoISAR image, as the polarization features of the target area. A process of extracting the polarization feature, the decomposition feature, and the terrain feature specifically includes the following steps. The full PoISAR image is input into Matlab to read a numerical value of each point, which is transferred to Excel to analyze the polarization features of different ground objects in the full PoISAR image. After that, the polarization feature of a landslide mass on the full PoISAR image is deeply analyzed, and a decomposition feature of the landslide mass is obtained on the basis of target decomposition. Finally, the full PoISAR image and the DEM data are registered to obtain the terrain feature.

Polarization feature: in the full PoISAR image, the vegetation on a surface of the landslide mass is destroyed, so that an underlying rock and soil mass is exposed, which has a strong reflection effect on electromagnetic waves. In the full PoISAR image, the area of the landslide mass often has higher brightness and higher scattering feature value and pixel decomposition value than those of other ground objects;

decomposition feature: the ground object types represented by different polarization basis matrices are obtained by defining methods for extracting polarization features of the different polarization basis matrices in the full PoISAR image. The scattering intensity of the PoISAR image is divided into odd scattering, even scattering, and volume scattering;

terrain feature: a spatial distribution feature of the landslide mass is solved by registering the full PoISAR image and the DEM data.

In step S6, a texture feature and a hue feature of the target area are determined according to the target full PoISAR data. Preferably, the texture feature and the hue feature of the target area are extracted from the target full PoISAR data after color synthesis.

In step S7, a spectrum feature of the target area is determined according to the target optical remote sensing data. Preferably, the spectrum feature of the target area is extracted from the preprocessed target optical remote sensing data.

In step S8, the texture feature, the hue feature, the spectrum feature, the polarization feature, the decomposition feature, and the terrain feature are fused to obtain a target fusion feature of the target area.

In step S9, the target fusion feature is input into a landslide mass identification model for identifying a landslide mass, so as to determine a landslide area in the target area. Preferably, the landslide area in the target area is marked at a corresponding position of the target full PoISAR data after the color synthesis, so as to facilitate viewing.

In the present embodiment, a process of constructing the landslide mass identification model includes following steps S101 to S103.

In step S101, a sample data set is acquired. The sample data set includes sample full PoISAR data, sample optical remote sensing data, and sample DEM data of multiple sample areas with marked landslide areas.

In step S102, a sample fusion feature corresponding to each of the sample areas is determined according to the sample full PoISAR data, the sample optical remote sensing data, and the sample DEM data. A method for determining the sample fusion feature is similar to the method for determining the target fusion feature, which will not be elaborated herein.

In step S103, an SVM model is trained by using the sample fusion feature to obtain a landslide mass identification model.

Specifically, in an SVM classification method, a target is captured on the basis of the spectrum, hue, and texture differences among remote sensing images, and the identification of a landslide mass in the PoISAR image is simplified to a binary classification problem. For a given training sample $x_j = (x'_{i1}, x'_{i2}, \ldots, x'_{ij})^T$, a superscript T indicates transposition; i represents a row serial number of a pixel in a color synthetic image of the PoISAR image (that is, full PoISAR data after color synthesis); j represents a column serial number of the pixel in the color synthetic image of the PoISAR image; $x'_{ij}$ represents an RGB value of a pixel in row i and column j of the color synthetic image of the PoISAR image; $x'_{i1}$ represents an RGB value of a pixel in row i and column 1; $x'_{i2}$ represents an RGB value of a pixel in row i and column 2; and l represents a subscript of a training sample, assuming that there are n training samples in total. $y_l=(-1,1)$ is set as a sample classification label corresponding to the lth training sample, where $y_l=1$ represents that the lth training sample is a landslide sample, and $y_l=-1$ represents that the lth training sample is a non-landslide sample. C is a penalty coefficient, and $\zeta=(\zeta_1, \zeta_2, \ldots, \zeta_n)$ is a slack variable, where $\zeta_1$ represents the first attention group, $\zeta_2$ represents a second attention group, $\zeta_3$ represents the third attention group, by such analogy, $\zeta_n$ represents the n th attention group, and the later the attention group is, the less attention will be paid to the factor. The landslide mass identification in the PoISAR image is equivalent to solving the following equation:

$$\min \varphi(\omega) = \frac{1}{2}(\omega \cdot \omega) + C\left(\sum_{l=1}^{n} \xi_l\right), \quad (1)$$

$$\text{s.t. } y_l[(\omega \cdot x_l) - b] \geq 1 - \xi_l, l = 1, 2, \ldots, n, \quad (2)$$

where, l represents a serial number of a training sample; n is a total number of the training samples; $\zeta_l$ represents the lth attention group; $\omega$ is a slope of a hyperplane solved by the SVM; b is an intercept of the hyperplane solved by the SVM; and the hyperplane solved by the SVM is represented as $\omega x+b$.

By solving equation (1), a discriminant function of the SVM can be obtained as follows:

$$f(x) = sgn\left(\sum_{l=1}^{n} y_l \omega^0 K(x_l, x_l) - b^0\right), \quad (3)$$

where, $K(\bullet)$ is a kernel function satisfying Mercer condition; $\omega^0$ represents a slope of the 0th hyperplane, and $b^0$ represents a intercept of the 0th hyperplane; $x_1$ represents the first training sample; $x_l$ represents the lth training sample; and $y_l$ represents a sample classification label corresponding to the lth training sample.

Further, the method for landslide identification based on full PoISAR according to the present disclosure further includes: limiting the accuracy of the identification results of the landslide mass identification model.

Specifically, error analysis is performed on the identified landslide mass classification results, the reliability of the results is determined by calculating a prediction error of the landslide mass identification model, and the results with large errors are reclassified. When the error is small, a landslide result at this time is output as a final result.

As a specific implementation, in the present disclosure, the error of the classification result (that is, the landslide identification result) of the SVM classification method is predicted, the sample separability is calculated according to the samples selected by the SVM, and whether the landslide identification result is qualified is determined by calculating the separability between a landslide area sample and a non-landslide area sample in the landslide identification result and comparing the separability with a set threshold value. For example, if the calculated separability is greater than 1.9, it indicates that the separability between samples is good and the samples are qualified; and if the separability is less than 1.8, the samples need to be re-selected for classification. The sample separability is in inversely proportional to the classification error, that is, the higher the sample separability is, the lower the classification error is. The classification error is predicted by the abovementioned method, and the results with large errors are re-classified. When the error is small, a landslide result at this time is output as a final result.

The method for landslide identification based on full PoISAR according to the present disclosure is discussed in detail below with reference to a specific embodiment.

Figure 2:
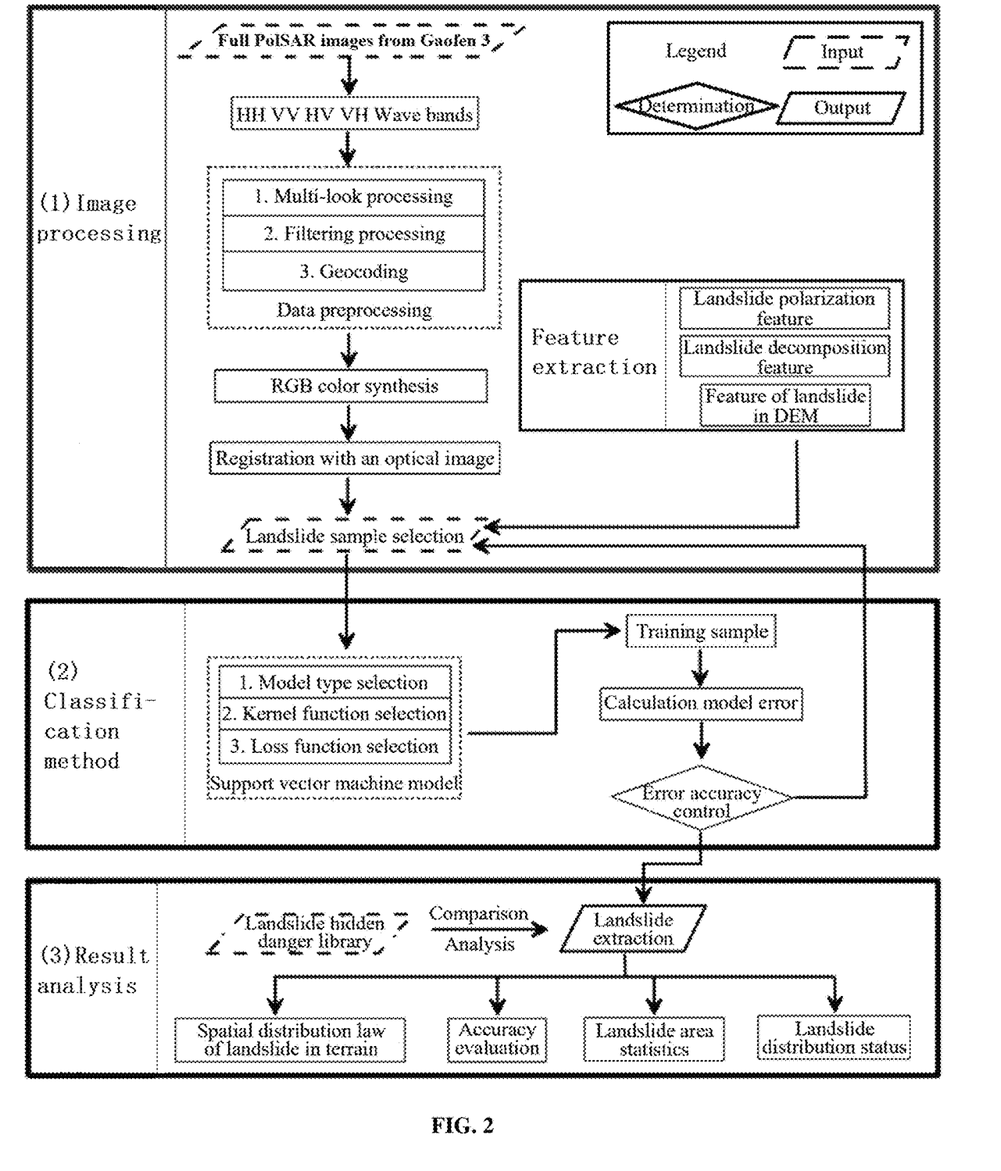
FIG. 2 is a specific flow block diagram of a method for landslide identification based on full PoISAR according to an embodiment of the present disclosure.

In the present embodiment, an automatic classification solution for quickly identifying the spatial distribution of a landslide in a large area on the basis of a mono-temporal PoISAR image. According to the solution, on the basis of deeply analyzing the polarization features of the landslide mass and other ground object types by using PoISAR images, through introducing a Pauli decomposition scattering feature and fusing multi-dimensional feature information such as a polarization feature, a texture feature, and a terrain feature, in combination with a high-resolution optical remote sensing image as training samples, an SVM-based classification method is constructed to perform automatic landslide identification on the PoISAR image. The flowchart of the method is as shown in FIG. 2, which includes the following specific steps.

In step one, PoISAR data, a high-resolution optical remote sensing image, and external reference DEM data covering a target area are collected. In the present embodiment, PoISAR images from Gaofen 3 satellite, ALOS WORLD 3D DEM data with 30 m spatial resolution, and Sentinel-2 optical remote sensing image are acquired, the abovementioned data is preprocessed, and color synthesis is performed by respectively taking the HH (red wave band), VV (green wave band), and VH (blue wave band) data in the PoISAR image as channels of RGB.

In step two, a polarization feature of a landslide mass on the PoISAR image is deeply analyzed, a decomposition feature of the landslide mass is obtained by introducing a Pauli decomposition method, a terrain feature is acquired by registering the decomposition feature with DEM data. The distribution characteristics of the landslide mass in terms of the polarization feature, the decomposition feature, and the terrain feature are respectively analyzed. A non-landslide area is roughly masked on the basis of the multiple features of the landslide mass, so as to roughly remove interferences of other ground objects on the identification of the landslide mass.

In Step three, the acquired Sentient-2 optical remote sensing image is registered with the PoISAR image from Gaofen 3 satellite. A landslide mass training sample vector is selected from the PoISAR image from Gaofen 3 satellite. A target is captured on the basis of the spectrum, hue, and texture differences among the PoISAR image. An SVM classification method is constructed to train and classify the landslide samples.

Figure 3:
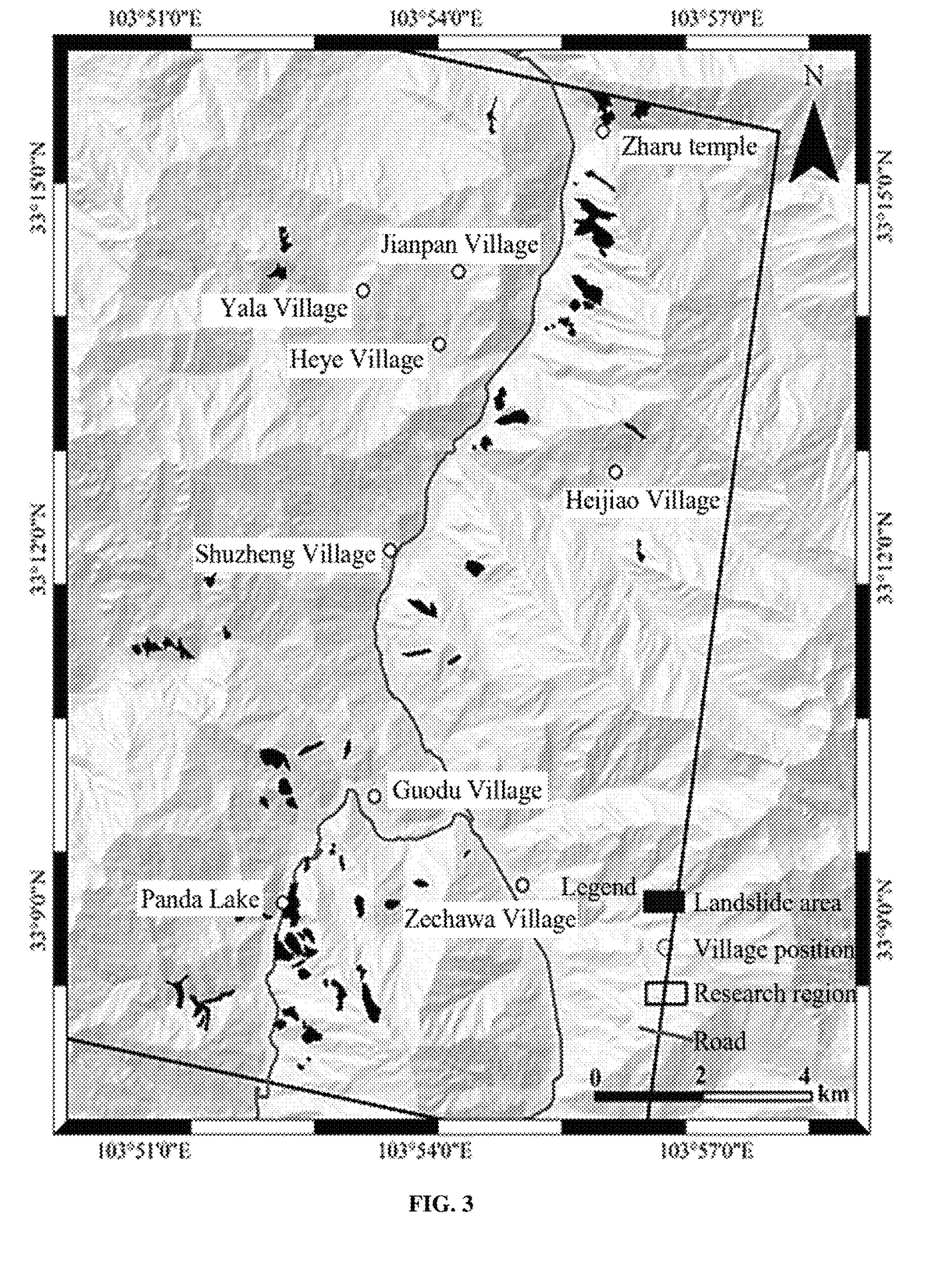
FIG. 3 is a schematic diagram of a landslide identification result for a target area according to an embodiment of the present disclosure.

In Step four, error calculation is performed on the classification results of the SVM classification method, and the results with large errors are reclassified. When the error is small, a landslide identification result at this time is output as a final result. Finally, a coseismic landslide result identified on the basis of the PoISAR image from Gaofen 3 satellite is finally obtained. The landslide identification result of the target area according to the embodiment of the present disclosure is as shown in FIG. 3. The abscissa represents the longitude of the target area, the ordinate represents the latitude of the target area, and the black part represents an identified landslide area.

In Step five, comparison and analysis are performed on a landslide hidden danger area in a landslide hidden danger library and the landslide area determined according to the present disclosure, the accuracy of the landslide identification result according to the present disclosure is evaluated, the landslide area identified according to the present disclosure is counted, and a diagram is drawn to show the distribution status of the landslide.

Embodiment 2

Figure 4:
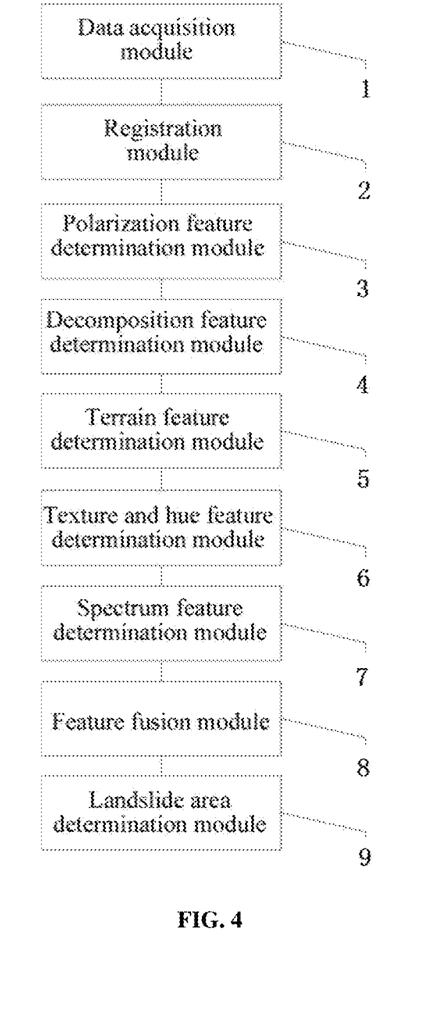
FIG. 4 is a structural block diagram of a system for landslide identification based on full PoISAR according to an embodiment of the present disclosure.

For implementing the method corresponding to the above-mentioned Embodiment 1 to achieve corresponding functions and technical effects, the present disclosure further provides a system for landslide identification based on full PoISAR. FIG. 4 is a structural block diagram of a system for landslide identification based on full PoISAR according to an embodiment of the present disclosure. As shown in FIG. 4, the system includes: a data acquisition module 1, a registration module 2, a polarization feature determination module 3, a decomposition feature determination module 4, a terrain feature determination module 5, a texture and hue feature determination module 6, a spectrum feature determination module 7, a feature fusion module 8, and a landslide area determination module 9.

The data acquisition module 1 is configured to acquire target full PoISAR data, target optical remote sensing data, and target DEM data of a target area.

The registration module 2 is configured to register the target full PoISAR data with the target optical remote sensing data and the target DEM data to obtain a first registration result and a second registration result.

The polarization feature determination module 3 is configured to determine a polarization feature of the target area according to the first registration result.

The decomposition feature determination module 4 is configured to determine a decomposition feature of the target area according to the polarization feature.

The terrain feature determination module 5 is configured to determine a terrain feature of the target area according to the second registration result.

The texture and hue feature determination module 6 is configured to determine a texture feature and a hue feature of the target area according to the target full PoISAR data.

The spectrum feature determination module 7 is configured to determine a spectrum feature of the target area according to the target optical remote sensing data.

The feature fusing module 8 is configured to fuse the texture feature, the hue feature, the spectrum feature, the polarization feature, the decomposition feature, and the terrain feature to obtain a target fusion feature of the target area.

The landslide area determination module 9 is configured to input the target fusion feature into a landslide mass identification model for identifying a landslide mass, so as to determine a landslide area in the target area.

Further, the registration module 2 includes: a data preprocessing submodule, a color synthesis submodule, a first registration submodule, and a second registration submodule.

The data preprocessing submodule is configured to preprocess the target full PoISAR data, the target optical remote sensing data, and the target full DEM data.

The color synthesis submodule is configured to perform color synthesis on the preprocessed target full PoISAR data.

The first registration submodule is configured to register the target full PoISAR data after the color synthesis with the preprocessed target optical remote sensing data to obtain the first registration result.

The second registration submodule is configured to register the target full PoISAR data after the color synthesis with the preprocessed target DEM data to obtain the second registration result.

Further, the data preprocessing submodule includes: a multi-look processing unit, a filtering processing unit, and a geocoding processing unit.

The multi-look processing unit is configured to perform multi-look processing on the target full PoISAR data.

The filtering processing unit is configured to perform filtering processing on the target full PoISAR data after the multi-look processing.

The geocoding processing unit is configured to perform geocoding processing on the full target PoISAR data after the filtering processing, and take the target full PoISAR data after the geocoding processing as preprocessed target full PoISAR data.

Further, the system also includes: a landslide mass identification model construction module. The landslide mass identification model construction module is configured to construct the landslide mass identification model.

In the present embodiment, the landslide mass identification model construction module includes: a data set acquisition submodule, a sample fusion feature determination submodule, and an SVM model training submodule.

The data set acquisition submodule is configured to acquire a sample data set. The sample data set includes sample full PoISAR data, sample optical remote sensing data, and sample digital elevation model data of multiple sample areas with marked landslide areas.

The sample fusion feature determination submodule is configured to determine a sample fusion feature corresponding to each of the sample areas according to the sample full PoISAR data, the sample optical remote sensing data, and the sample DEM data.

The SVM model training submodule is configured to train an SVM model by using the sample fusion feature to obtain the landslide mass identification model.

Embodiment 3

The embodiments of the present disclosure further provide an electronic device, which includes a memory and a processor. The memory is configured to store a computer program, and the processor is configured to run the computer program to enable the electronic device to execute the method for landslide identification based on full PoISAR according to Embodiment 1. The electronic device may be a server.

In addition, the present disclosure further provides a computer-readable storage medium, which stores a computer program. The method for landslide identification based on full PoISAR according to Embodiment 1 may be implemented when the computer program is executed by a processor.

Various embodiments in the present specification are described in a progressive manner. Each embodiment focuses on differences from other embodiments, and the same and similar parts of various embodiments may be referred to one another.

Herein, specific examples are used to describe the principle and implementations of the present disclosure. The description of the embodiments above is merely intended to help understand the core idea of the present disclosure. Meanwhile, those of ordinary skill in the art may make modifications based on the idea of the present disclosure with respect to the specific implementations and the application scope. In conclusion, the content of the specification shall not be construed as a limitation to the present disclosure.

What is claimed is:

1. A method for landslide identification based on full Polarimetry Synthetic Aperture Radar (PoISAR), comprising:
   acquiring target full PoISAR data, target optical remote sensing data, and target Digital Elevation Model (DEM) data of a target area;
   registering the target full PoISAR data with the target optical remote sensing data and the target DEM data to obtain a first registration result and a second registration result;
   determining a polarization feature of the target area according to the first registration result;
   determining a decomposition feature of the target area according to the polarization feature;
   determining a terrain feature of the target area according to the second registration result;
   determining a texture feature and a hue feature of the target area according to the target full PoISAR data;
   determining a spectrum feature of the target area according to the target optical remote sensing data;
   fusing the texture feature, the hue feature, the spectrum feature, the polarization feature, the decomposition feature, and the terrain feature to obtain a target fusion feature of the target area; and
   inputting the target fusion feature into a landslide mass identification model for identifying a landslide mass, so as to determine a landslide area in the target area;
   wherein a process of constructing the landslide mass identification model comprises the following steps:
   acquiring a sample data set, which comprises sample full PoISAR data, sample optical remote sensing data, and sample DEM data of a plurality of sample areas with marked landslide areas;
   determining a sample fusion feature corresponding to each of the same areas according to the sample full PoISAR data, the sample optical remote sensing data, and the sample DEM data; and,
   training an SVM model by using the sample fusion feature to obtain a landslide mass identification model;
   wherein for a given training sample $x_i = (x'_{i1}, x'_{i2}, \ldots, x'_{ij})^T$, a superscript T indicates transposition; i represents a row serial number of a pixel in a color synthetic image of a PoISAR image; j represents a column serial number of the pixel in the color synthetic image of the PoISAR image; $x_{ij}$ represents an RGB value of a pixel in row i and column j of the color synthetic image of the PoISAR image; $x_{i1}$ represents an RGB value of a pixel in row i and column 1; $x_{i2}$ represents an RGB value of a pixel in row i and column 2; and l represents a subscript of a training sample, assuming that there are n training samples in total; $y_l = (-1,1)$ is set as a sample classification label corresponding to a lth training sample, wherein $y_l = 1$ represents that the lth training sample is a landslide sample, and $y_l = -1$ represents that the lth training sample is non-landslide sample; C is a penalty coefficient, and $\zeta = (\zeta_1, \zeta_2, \ldots, \zeta_n)$ is a slack variable, where $\zeta_1$ represents the first attention group, $\zeta_2$ represents a second attention group, $\zeta_3$ represents a third attention group, by such analogy, $\zeta_n$ represents a nth attention group, and the later the attention group is, the less attention is paid to the factor; the landslide mass identification in the PoISAR image is equivalent to solving following equation:

$$\min \varphi(\omega) = \frac{1}{2}(\omega \cdot \omega) + C\left(\sum_{l=1}^{n} \xi_l\right), \qquad (1)$$

$$\text{s.t. } y_l[(\omega \cdot x_l) - b] \geq 1 - \xi_l, l = 1, 2, \ldots, n, \qquad (2)$$

wherein, l represents a serial number of a training sample; n is a total number of the training samples; $\zeta_l$ represents the lth attention group; $\omega$ is a slope of a hyperplane solved by the SVM; b is an intercept of the hyperplane solved by the SVM; and the hyperplane solved by the SVM is represented as $\omega x + b$;
a discriminant function of the SVM is as follows:

$$f(x) = sgn\left(\sum_{l=1}^{n} y_l \omega^0 K(x_l, x_l) - b^0\right), \qquad (3)$$

wherein, $K(\cdot)$ is a kernel function satisfying Mercer condition; $\omega^0$ represents a slop of $0^{th}$ hyperplane, and $b^0$ represents an intercept of the $0^{th}$ hyperplane; $x_1$ represents a first training sample; $x_l$ represents the lth training sample; and $y_l$ represents a sample classification label corresponding to the lth training sample.

2. The method according to claim 1, wherein the registering the target full PoISAR data with the target optical remote sensing data and the target DEM data to obtain a first registration result and a second registration result comprises:
   preprocessing the target full PoISAR data, the target optical remote sensing data, and the target DEM data;
   performing color synthesis on the preprocessed target full PoISAR data;
   registering the target full PoISAR data after the color synthesis with the preprocessed target optical remote sensing data to obtain the first registration result; and
   registering the target full PoISAR data after the color synthesis with the preprocessed target DEM data to obtain the second registration result.

3. The method according to claim 2, wherein the preprocessing the target full PoISAR data comprises:
   performing multi-look processing on the target full PoISAR data;
   performing filtering processing on the target full PoISAR data after the multi-look processing; and
   performing geocoding processing on the target full PoISAR data after the filtering processing, and deeming the target full PoISAR data after the geocoding processing as preprocessed target full PoISAR data.

4. A non-transitory computer-readable storage medium, storing a computer program, wherein the method for landslide identification based on full PoISAR according to claim 1 is implemented when the computer program is executed by a processor.

5. The non-transitory computer readable storage medium according to claim 4, wherein the registering the target full PoISAR data with the target optical remote sensing data and the target DEM data to obtain a first registration result and a second registration result comprises:
   preprocessing the target full PoISAR data, the target optical remote sensing data, and the target DEM data;

performing color synthesis on the preprocessed target full PoISAR data;
registering the target full PoISAR data after the color synthesis with the preprocessed target optical remote sensing data to obtain the first registration result; and
registering the target full PoISAR data after the color synthesis with the preprocessed target DEM data to obtain the second registration result.

6. The non-transitory computer readable storage medium according to claim 5, wherein the preprocessing the target full PoISAR data comprises:
performing multi-look processing on the target full PoISAR data;
performing filtering processing on the target full PoISAR data after the multi-look processing; and
performing geocoding processing on the target full PoISAR data after the filtering processing, and deeming the target full PoISAR data after the geocoding processing as preprocessed target full PoISAR data.

7. A system for landslide identification based on full PoISAR, comprising:
a data acquisition module, configured to acquire target full PoISAR data, target optical remote sensing data, and target DEM data of a target area;
a registration module, configured to register the target full PoISAR data with the target optical remote sensing data and the target DEM data to obtain a first registration result and a second registration result;
a polarization feature determination module, configured to determine a polarization feature of the target area according to the first registration result;
a decomposition feature determination module, configured to determine a decomposition feature of the target area according to the polarization feature;
a terrain feature determination module, configured to determine a terrain feature of the target area according to the second registration result;
a texture and hue feature determination module, configured to determine a texture feature and a hue feature of the target area according to the target full PoISAR data;
a spectrum feature determination module, configured to determine a spectrum feature of the target area according to the target optical remote sensing data;
a feature fusing module, configured to fuse the texture feature, the hue feature, the spectrum feature, the polarization feature, the decomposition feature, and the terrain feature to obtain a target fusion feature of the target area;
a landslide area determination module, configured to input the target fusion feature into a landslide mass identification model for identifying a landslide mass, so as to determine a landslide area in the target area; and,
a landslide mass identification model construction module, configured to construct the landslide mass identification model;
wherein the landslide mass identification model construction module comprises:
a data set acquisition submodule, configured to acquire a sample data set, which comprises sample full PoISAR data, sample optical remote sensing data, and sample digital elevation model data of a plurality of sample areas with marked landslide areas;
a sample fusion feature determination submodule, configured to determine a sample fusion feature corresponding to each of the sample areas according to the sample full PoISAR data, the sample optical remote sensing data, and the sample DEM data; and an SVM model training submodule, configured to train an SVM model by using the sample fusion feature to obtain the landslide mass identification model;
wherein for a given training sample $x_{\bar{l}}=(x'_{i1}, x'_{i2}, \ldots, x'_{ij})^T$, a superscript T indicates transposition; i represents a row serial number of a pixel in a color synthetic image of a PoISAR image; j represents a column serial number of the pixel in the color synthetic image of the PoISAR image; $x_{ij}$ represents an RGB value of a pixel in row i and column j of the color synthetic image of the PoISAR image; $x_{i1}$ represents an RGB value of a pixel in row i and column 1; $x_{i2}$ represents an RGB value of a pixel in row i and column 2; and l represents a subscript of a training sample, assuming that there are n training samples in total; $y_{\bar{l}}=(-1,1)$ is set as a sample classification label corresponding to a lth training sample, wherein $y_{\bar{l}}=1$ represents that the lth training sample is a landslide sample, and $y_{\bar{l}}=-1$ represents that the lth training sample is non-landslide sample; C is a penalty coefficient, and $\zeta=(\zeta_1, \zeta_2, \ldots, \zeta_n)$ is a slack variable, where $\zeta_1$ represents the first attention group, $\zeta_2$ represents a second attention group, $\zeta_3$ represents a third attention group, by such analogy, $\zeta_n$ represents a nth attention group, and the later the attention group is, the less attention is paid to the factor; the landslide mass identification in the PoISAR image is equivalent to solving following equation:

$$\min \varphi(\omega) = \frac{1}{2}(\omega \cdot \omega) + C\left(\sum_{l=1}^{n} \xi_l\right), \quad (1)$$

$$\text{s.t. } y_l[(\omega \cdot x_l) - b] \geq 1 - \xi_l, l = 1, 2, \ldots, n, \quad (2)$$

wherein, l represents a serial number of a training sample; n is a total number of the training samples; $\xi_l$ represents the lth attention group; $\omega$ is a slope of a hyperplane solved by the SVM; b is an intercept of the hyperplane solved by the SVM; and the hyperplane solved by the SVM is represented as $\omega x+b$;
a discriminant function of the SVM is as follows:

$$f(x) = sgn\left(\sum_{l=1}^{n} y_l \omega^0 K(x_l, x_l) - b^0\right), \quad (3)$$

wherein, $K(\cdot)$ is a kernel function satisfying Mercer condition; $\omega^0$ represents a slop of 0th hyperplane, and $b^0$ represents an intercept of the 0th hyperplane; $x_1$ represents a first training sample; $x_l$ represents the lth training sample; and $y_l$ represents a sample classification label corresponding to the lth training sample.

8. The system according to claim 7, wherein the registration module comprises:
a data preprocessing submodule, configured to preprocess the target full PoISAR data, the target optical remote sensing data, and the target DEM data;
a color synthesis submodule, configured to perform color synthesis on the preprocessed target full PoISAR data;
a first registration submodule, configured to register the target full PoISAR data after the color synthesis with the preprocessed target optical remote sensing data to obtain the first registration result; and
a second registration submodule, configured to register the target full PoISAR data after the color synthesis with the preprocessed target DEM data to obtain the second registration result.

9. The system according to claim 8, wherein the data preprocessing submodule comprises:
   a multi-look processing unit, configured to perform multi-look processing on the target full PoISAR data;
   a filtering processing unit, configured to perform filtering processing on the target full PoISAR data after the multi-look processing; and
   a geocoding processing unit, configured to perform geocoding processing on the target full PoISAR data after the filtering processing, and deem the target full PoISAR data after the geocoding processing as preprocessed target full PoISAR data.

10. An electronic device, comprising a memory and a processor, wherein the memory is configured to store a computer program; and the processor is configured to run the computer program to enable the electronic device to execute a method for landslide identification based on full PoISAR, the method comprises:
   acquiring target full PoISAR data, target optical remote sensing data, and target DEM data of a target area;
   registering the target full PoISAR data with the target optical remote sensing data and the target DEM data to obtain a first registration result and a second registration result;
   determining a polarization feature of the target area according to the first registration result;
   determining a decomposition feature of the target area according to the polarization feature;
   determining a terrain feature of the target area according to the second registration result;
   determining a texture feature and a hue feature of the target area according to the target full PoISAR data;
   determining a spectrum feature of the target area according to the target optical remote sensing data;
   fusing the texture feature, the hue feature, the spectrum feature, the polarization feature, the decomposition feature, and the terrain feature to obtain a target fusion feature of the target area; and
   inputting the target fusion feature into a landslide mass identification model for identifying a landslide mass, so as to determine a landslide area in the target area;
   wherein a process of constructing the landslide mass identification model comprises the following steps:
   acquiring a sample data set, which comprises sample full PoISAR data, sample optical remote sensing data, and sample DEM data of a plurality of sample areas with marked landslide areas;
   determining a sample fusion feature corresponding to each of the same areas according to the sample full PoISAR data, the sample optical remote sensing data, and the sample DEM data; and,
   training an SVM model by using the sample fusion feature to obtain a landslide mass identification model;
   wherein for a given training sample $x_i=(x'_{i1}, x'_{i2}, \ldots, x'_{ij})^T$, a superscript T indicates transposition; i represents a row serial number of a pixel in a color synthetic image of a PoISAR image; j represents a column serial number of the pixel in the color synthetic image of the PoISAR image; $x_{ij}$ represents an RGB value of a pixel in row i and column j of the color synthetic image of the PoISAR image; $x_{i1}$ represents an RGB value of a pixel in row i and column 1; $x_{i2}$ represents an RGB value of a pixel in row i and column 2; and l represents a subscript of a training sample, assuming that there are n training samples in total; $y_l=(-1,1)$ is set as a sample classification label corresponding to a lth training sample, wherein $y_l=1$ represents that the lth training sample is a landslide sample, and $y_l=-1$ represents that the lth training sample is non-landslide sample; C is a penalty coefficient, and $\zeta=(\zeta 1, \zeta 2, \ldots, \zeta n)$ is a slack variable, where $\zeta_1$ represents the first attention group, $\zeta_2$ represents a second attention group, $\zeta_3$ represents a third attention group, by such analogy, $\zeta_n$ represents a nth attention group, and the later the attention group is, the less attention is paid to the factor; the landslide mass identification in the PoISAR image is equivalent to solving following equation:

$$\min \varphi(\omega) = \frac{1}{2}(\omega \cdot \omega) + C\left(\sum_{l=1}^{n} \xi_l\right), \quad (1)$$

$$\text{s.t. } y_l[(\omega \cdot x_l) - b] \geq 1 - \xi_l, l = 1, 2, \ldots, n, \quad (2)$$

wherein, l represents a serial number of a training sample; n is a total number of the training samples; $\zeta_l$ represents the lth attention group; ω is a slope of a hyperplane solved by the SVM; b is an intercept of the hyperplane solved by the SVM; and the hyperplane solved by the SVM is represented as ωx+b;
a discriminant function of the SVM is as follows:

$$f(x) = sgn\left(\sum_{l=1}^{n} y_l \omega^0 K(x_l, x_l) - b^0\right), \quad (3)$$

wherein, K(•) is a kernel function satisfying Mercer condition; $\omega^0$ represents a slop of $0^{th}$ hyperplane, and $b^0$ represents an intercept of the $0^{th}$ hyperplane; $x_1$ represents a first training sample; $x_l$ represents the lth training sample; and $y_l$ represents a sample classification label corresponding to the lth training sample.

11. The electronic device according to claim 10, wherein the registering the target full PoISAR data with the target optical remote sensing data and the target DEM data to obtain a first registration result and a second registration result comprises:
   preprocessing the target full PoISAR data, the target optical remote sensing data, and the target DEM data;
   performing color synthesis on the preprocessed target full PoISAR data;
   registering the target full PoISAR data after the color synthesis with the preprocessed target optical remote sensing data to obtain the first registration result; and
   registering the target full PoISAR data after the color synthesis with the preprocessed target DEM data to obtain the second registration result.

12. The electronic device according to claim 11, wherein the preprocessing the target full PoISAR data comprises:
   performing multi-look processing on the target full PoISAR data;
   performing filtering processing on the target full PoISAR data after the multi-look processing; and
   performing geocoding processing on the target full PoISAR data after the filtering processing, and deeming the target full PoISAR data after the geocoding processing as preprocessed target full PoISAR data.

* * * * *